(12) United States Patent
Aoyagi et al.

(10) Patent No.: US 11,501,439 B2
(45) Date of Patent: Nov. 15, 2022

(54) DIAGNOSIS SUPPORT APPARATUS AND X-RAY CT APPARATUS

(71) Applicant: CANON MEDICAL SYSTEMS CORPORATION, Otawara (JP)

(72) Inventors: Kota Aoyagi, Nasushiobara (JP); Yasuko Fujisawa, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 0 days.

(21) Appl. No.: 16/883,044

(22) Filed: May 26, 2020

(65) Prior Publication Data

US 2020/0380680 A1   Dec. 3, 2020

(30) Foreign Application Priority Data

May 27, 2019 (JP) .............................. JP2019-098403

(51) Int. Cl.
*G06T 7/00* (2017.01)
*G06K 9/62* (2022.01)
*G06T 11/00* (2006.01)
*G06V 10/40* (2022.01)

(52) U.S. Cl.
CPC .......... *G06T 7/0014* (2013.01); *G06K 9/6262* (2013.01); *G06T 11/003* (2013.01); *G06V 10/40* (2022.01); *G06T 2207/10081* (2013.01); *G06T 2207/10116* (2013.01); *G06T 2207/20081* (2013.01); *G06T 2210/41* (2013.01); *G06V 2201/03* (2022.01)

(58) Field of Classification Search
USPC .................................................. 382/128, 131
See application file for complete search history.

(56) References Cited

U.S. PATENT DOCUMENTS

| 10,032,294 | B2 * | 7/2018 | Bernard | ................ A61B 6/481 |
| 10,096,106 | B2 * | 10/2018 | Bernard | ............... G06T 11/003 |
| 2013/0070984 | A1 * | 3/2013 | Shirasaka | ............... G06T 19/20 382/128 |
| 2016/0189376 | A1 * | 6/2016 | Bernard | ................ A61B 6/502 382/132 |
| 2017/0024634 | A1 * | 1/2017 | Miao | ........................ G06T 7/33 |

OTHER PUBLICATIONS

Li, Z., et al., "Thoracic Disease Identification and Localization with Limited Supervision," IEEE/CVF Conference on Computer Vision and Pattern Recognition, 2018, arXiv:1711.06373v6 [cs.CV] Jun. 20, 2018, pp. 1-12.

* cited by examiner

*Primary Examiner* — Ishrat I Sherali
(74) *Attorney, Agent, or Firm* — Oblon, McClelland, Maier & Neustadt, L.L.P.

(57) ABSTRACT

In one embodiment, a diagnosis support apparatus includes: an input circuit configured to acquire a first medical image; and processing circuitry configured to generate a second medical image from the first medical image in such a manner that information included in the second medical image is reduced from information included in the first medical image, extract auxiliary information from the first medical image, and perform inference of a disease by using the second medical image and the auxiliary information.

5 Claims, 14 Drawing Sheets

DIAGNOSIS SUPPORT APPARATUS AND X-RAY CT APPARATUS

CROSS-REFERENCE TO RELATED APPLICATION

This application is based upon and claims the benefit of priority from Japanese Patent Application No. 2019-098403, filed on May 27, 2019, the entire contents of which are incorporated herein by reference.

FIELD

Disclosed embodiments relate to a diagnosis support apparatus and an X-ray CT apparatus.

BACKGROUND

Today, various diseases have been diagnosed on the basis of analysis of medical images that are generated by imaging an object (i.e., patient) with a modality such as an X-ray imaging apparatus, an X-ray CT (Computed Tomography) apparatus, an MRI (Magnetic Resonance Imaging) apparatus, and an ultrasonic diagnostic apparatus.

Although various diagnosis support apparatuses using medical images as inputs have been reported so far, recently, a diagnosis support apparatus and a diagnosis support system using various machine learning techniques are actively researched and developed.

For example, a technique for inferring a disease name and a disease site of the chest by deep learning using a simple X-ray image of the chest has been proposed. Additionally, a system for performing abnormality detection using an X-ray CT image has also been proposed.

Since a simple X-ray image represents the entire range of an imaging target with a single two-dimensional image, the simple X-ray image is suitable for detecting abnormality in the entire imaging range but has a shortage of information as compared with an X-ray CT image. For this reason, when a suspicious site is found in a simple X-ray image, an X-ray CT image is often acquired for a more detailed examination.

An X-ray CT image is characterized by high resolution and acquisition of three-dimensional information, and thus is suitable for detailed evaluation of abnormality. However, for the purpose of detecting abnormality using a technique such as machine learning, the amount of information included in an X-ray CT image is too large, and the processing load on the computer increases. When performing supervised learning, it is necessary to manually label the ground-truth. However, since an X-ray CT image is three-dimensional, it takes more time to label the ground truth than a simple X-ray image, which makes it difficult to collect training datasets.

In an examination using an X-ray CT apparatus, an initial examination for screening purpose is performed by using a relatively low-resolution X-ray CT image that is acquired under X-ray imaging at a low dose. When it is determined that a detailed examination is necessary as a result of the initial examination, an examination using X-ray CT images generated under imaging conditions for the detailed examination is often conducted at a later date. For this reason, it may take time from the initial examination to the detection of abnormality by the detailed examination.

DETAILED DESCRIPTION

Hereinafter, embodiments of a diagnosis support apparatus and an X-ray CT apparatus will be described by referring to the accompanying drawings.

In one embodiment, a diagnosis support apparatus includes: an input circuit configured to acquire a first medical image; and processing circuitry configured to generate a second medical image from the first medical image in such a manner that information included in the second medical image is reduced from information included in the first medical image, extract auxiliary information from the first medical image, and perform inference of a disease by using the second medical image and the auxiliary information.

Figure 1:
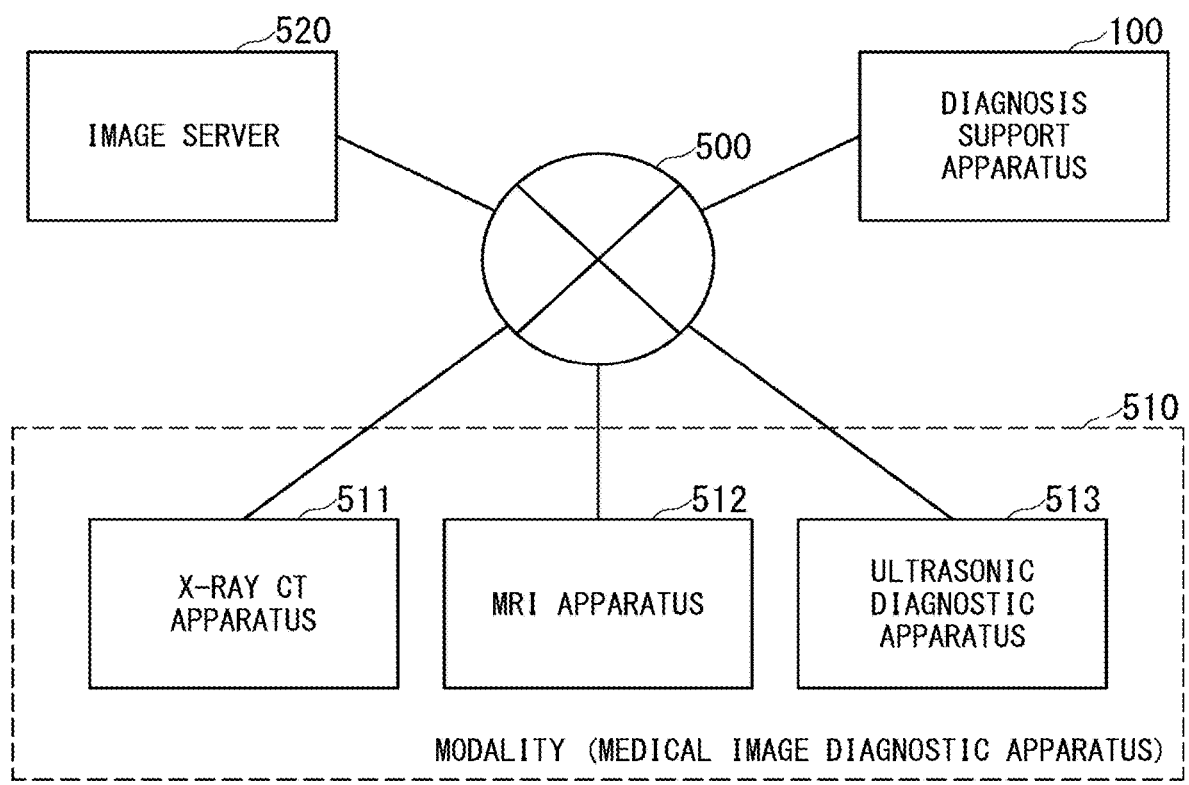
FIG. 1 is a configuration diagram illustrating a medical image processing system that includes the diagnosis support apparatus according to the first embodiment.

FIG. 1 is a configuration diagram illustrating a medical image processing system that includes the diagnosis support apparatus 100 according to one embodiment. The medical image processing system is, for example, a system performing a series of processing related to medical images, such as acquiring medical images, performing image processing, storing and using the medical images in a hospital. The use of medical images includes support of doctors by CAD (Computer-Aided Diagnosis) using the diagnosis support apparatus 100.

The medical image processing system includes an image server 520, a diagnosis support apparatus 100, and a modality 510 (i.e., medical image diagnostic apparatus 510) that acquires medical images from an object such as a patient, and the modality 510 is configured as, for example, an X-ray CT apparatus 511, an MRI apparatus 512, or an ultrasonic diagnostic apparatus 513. These apparatuses are interconnected via, for example, a network 500 in a hospital so that various data and medical images can be exchanged.

Configuration of First Embodiment

Figure 2:
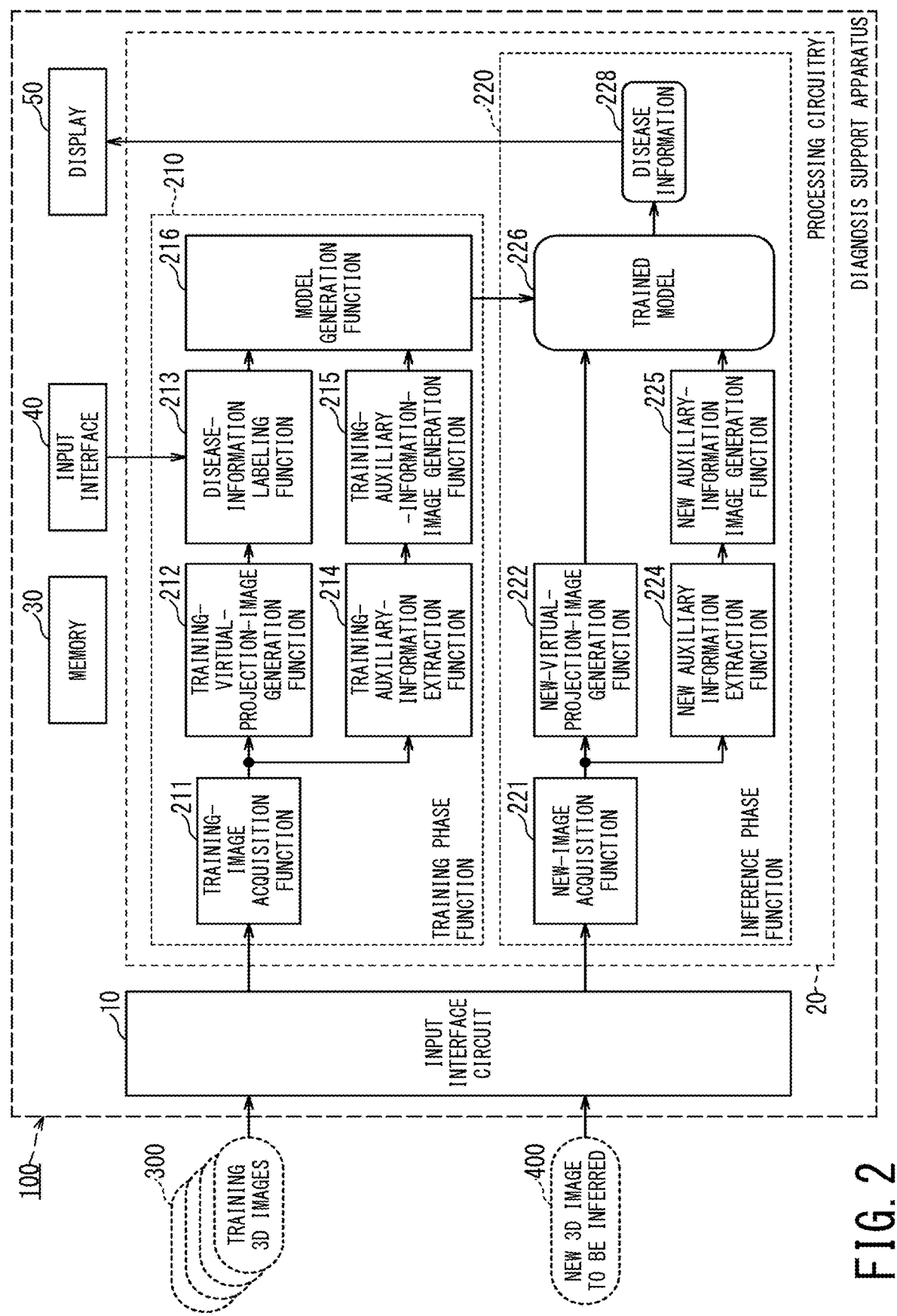
FIG. 2 is a block diagram illustrating the configuration of the diagnosis support apparatus according to the first embodiment.

FIG. 2 is a block diagram illustrating the configuration of the diagnosis support apparatus 100 according to the first embodiment. The diagnosis support apparatus 100 includes, for example, an input interface circuit 10, processing circuitry 20, a memory 30, an input interface 40, and a display 50. The diagnosis support apparatus 100 is configured as a so-called workstation or a high-performance personal computer, for example.

The diagnosis support apparatus 100 of each embodiment can provide a diagnosis support function based on a machine learning function. In order to realize the diagnosis support function based on the machine learning function, in the training phase, a trained model for diagnosing disease is constructed by machine learning with the use of training dataset including medical images. On the other hand, in the inference phase, new medical images are inputted to the trained model constructed in the training phase to obtain inferred disease information.

The input interface circuit 10 is an input circuit for inputting data via a storage medium, such as an optical disk and a USB memory, or for inputting data via a wired, wireless network, or a special-purpose or general-purpose communication line. In the training phase, the diagnosis support apparatus 100 of the first embodiment acquires a 3D (three-dimensional) volume image 300 for training (for example, X-ray CT image), which is imaged by the modality 510 such as the X-ray CT apparatus 511 or is stored in the image server 520, as a first image via the input interface circuit 10.

Similarly, in the inference phase, the diagnosis support apparatus 100 of the first embodiment acquires a new 3D volume image 400 (for example, X-ray CT image) to be inferred, which is imaged by the modality 510 such as the X-ray CT apparatus 511 or is stored in the image server 520, as the first image via the input interface circuit 10.

The memory 30 is a recording medium, including a read-only memory (ROM) and a random access memory (RAM) in addition to an external memory device such as a hard disk drive (HDD) and/or an optical disc device. The memory 30 stores a trained model generated in the training phase described below. In the inference phase, the trained model stored in the memory 30 is read out. The memory 30 stores, in addition to the trained model, various programs to be executed by the processor included in the processing circuitry 20.

The input interface 40 includes various devices for an operator to input various types of information and data, and is configured of a mouse, a keyboard, a trackball, and a touch panel, for example.

The display 50 is a display device such as a liquid crystal display panel, a plasma display panel, and an organic EL panel.

The processing circuitry 20 is a circuit that includes a central processing unit (CPU) and/or a special-purpose or general-purpose processor, for example. The processor implements various functions described below by executing the programs stored in the memory 30. The processing circuitry 20 may be configured of hardware such as an FPGA (field programmable gate array) and an ASIC (application specific integrated circuit). The various functions described below can also be implemented by such hardware. Additionally, the processing circuitry 20 can implement the various functions by combining hardware processing and software processing based on its processor and programs.

Further, the processing circuitry 20 may be configured by combining a plurality of independent processors such that the processors implement the respective functions. When the processing circuitry 20 is provided with the plurality of processors, a memory for storing the programs may be provided for each processor, or alternatively, one memory may collectively store all the programs corresponding to all the processors.

Operation of First Embodiment

The processing circuitry 20 of the first embodiment implements the respective functions shown in FIG. 2, i.e., the training phase function 210 and the inference phase function 220.

Specifically, the processing circuitry 20 implements each of a training-image acquisition function 211, a training-virtual-projection-image generation function 212, a disease-information labeling function 213, a training-auxiliary-information extraction function 214, a training-auxiliary-information-image generation function 215, and a model generation function 216, and these functions 211 to 226 are implemented as individual functions in the training phase function 210. A model generated by the training phase function 210 is stored in the memory 30 as a trained model 226.

Further, the processing circuitry 20 implements each of a new-image acquisition function 221, a new-virtual-projection-image generation function 222, a new auxiliary-information extraction function 224, and a new auxiliary-information image generation function 225, and these functions 221, 222, 224, 225 are implemented as individual functions in the inference phase function 220. The processing circuitry 20 applies each function of the inference phase to the trained model 226, which is read out from the memory 30, so as to acquire disease information 228 inferred by the trained model 226.

The disease information 228 includes, for example, inferred information on a disease name and/or a disease site, and/or information indicating the likelihood of disease inference. The information on the disease site may include, for example, information on an anatomical site or an organ in which a disease is suspected.

The processor included in the processing circuitry 20 implements each of the above-described functions by executing predetermined programs stored in the memory 30, for example.

Hereinafter, each function in the training phase function 210 will be described in detail by using the flowchart shown in FIG. 3 and the operation conception diagram shown in FIG. 4. Similarly, each function in the inference phase function 220 will be described in detail by using the flowchart shown in FIG. 5 and the operation conception diagram shown in FIG. 6.

Figure 3:
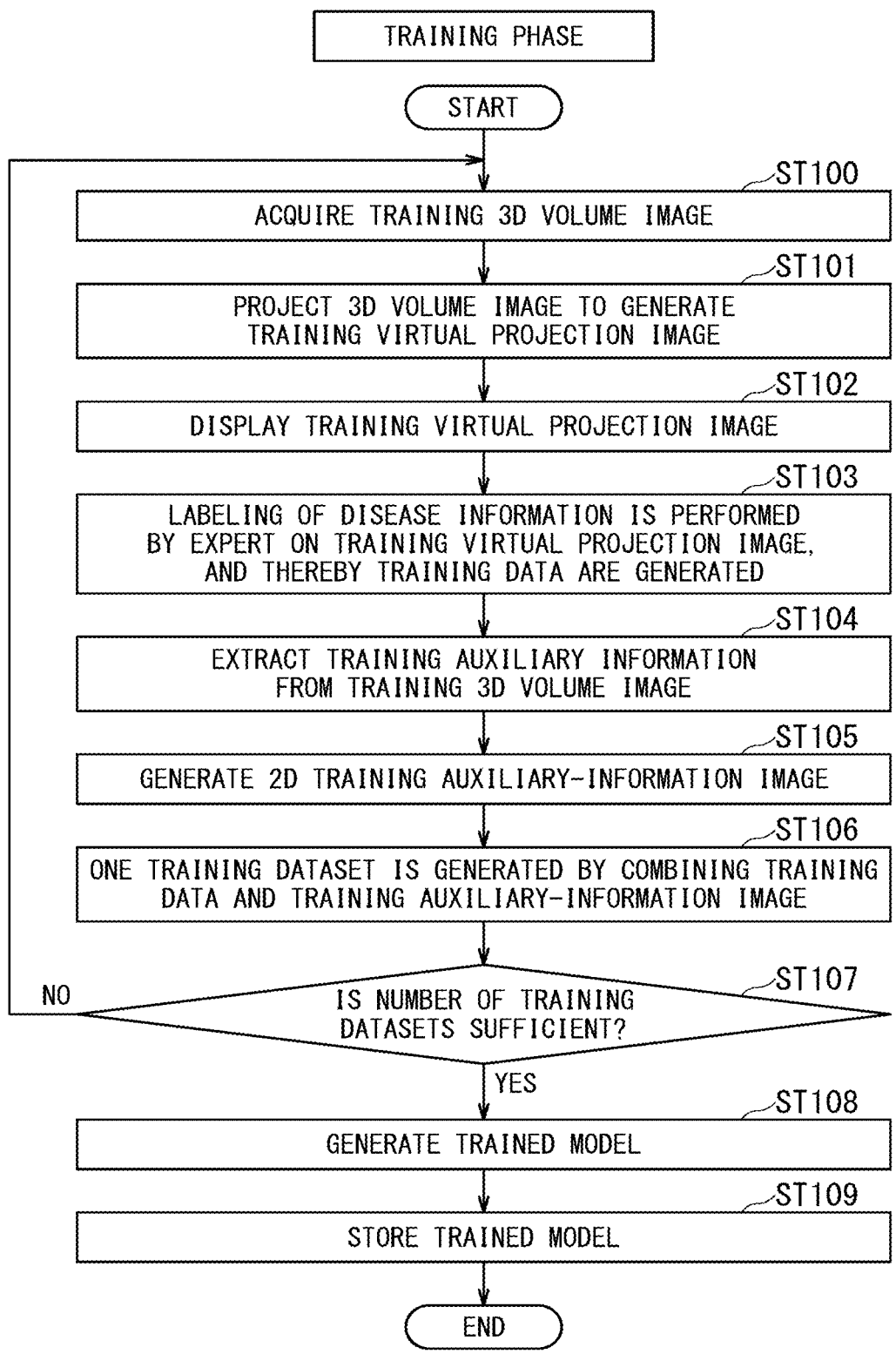
FIG. 3 is a flowchart illustrating an operation of a training phase of the first embodiment.

First, in the step ST100 in FIG. 3, a training 3D volume image is acquired. The training 3D volume image is, for example, an X-ray CT image generated by the X-ray CT apparatus 511, but is not limited to this. The training 3D volume image may be, for example, a 3D MRI image generated by the MRI apparatus 512 or a 3D ultrasonic image generated by the ultrasonic diagnostic apparatus 513.

Figure 4:
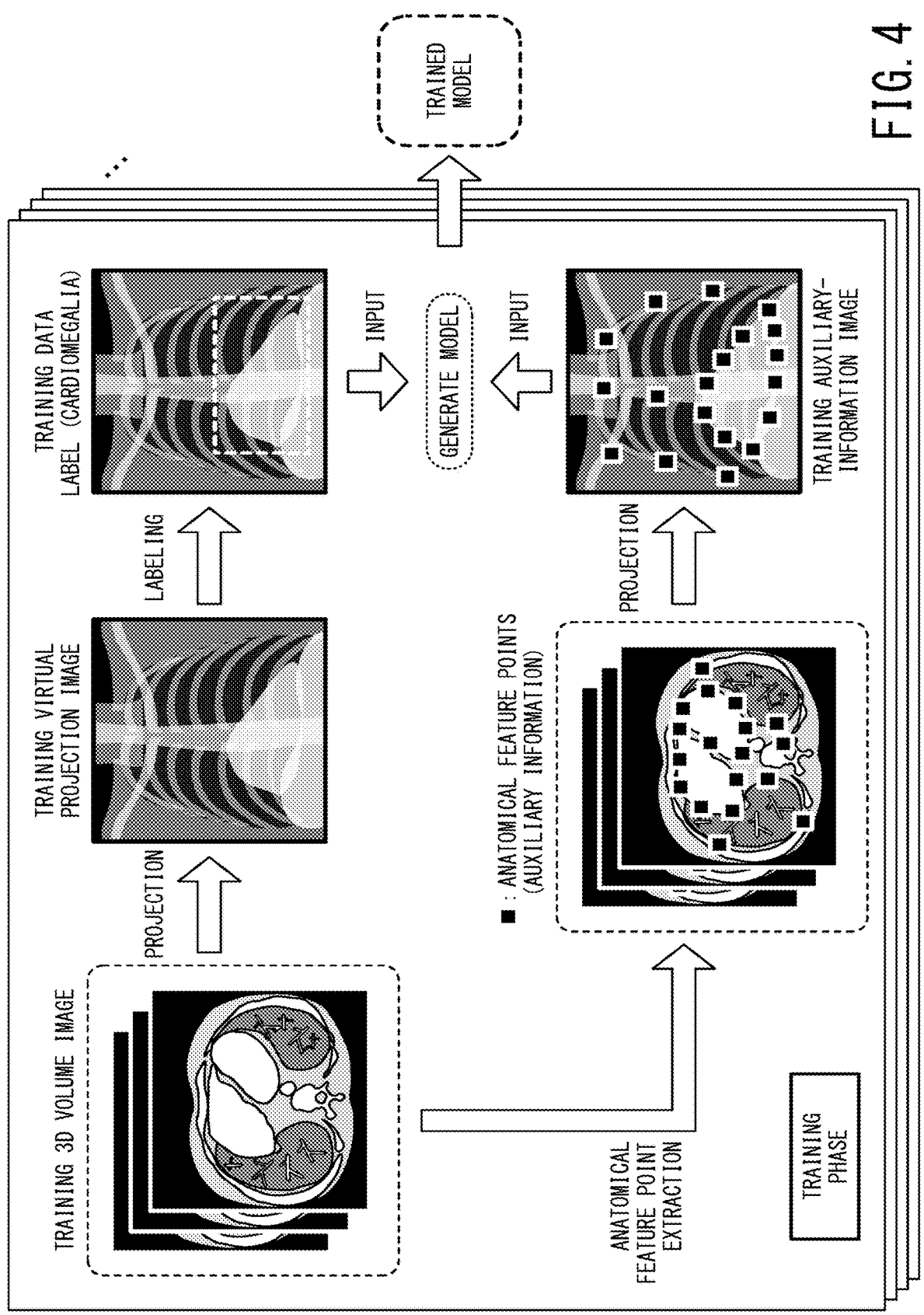
FIG. 4 is a schematic diagram illustrating an operation concept of the training phase.

When the training 3D volume image is an X-ray CT image, the X-ray CT image includes a large number of X-ray tomographic images as shown in the upper left of FIG. 4.

The processing of the step ST100 is executed by the training-image acquisition function 211.

In the next step ST101, training 3D volume image is projected to generate a 2D (two-dimensional) virtual projection image for training. Here, the "virtual projection image" is, for example, an image simulating a 2D general X-ray image. The term "virtual" is used because it is not an X-ray image actually generated by using a general X-ray imaging apparatus but a 2D image generated by projecting a 3D X-ray CT image. The processing of generating a 2D virtual projection image from a 3D volume image is processing of reducing the amount of information originally possessed by the 3D volume image. Thus, when the 3D volume image is defined as the first medical image and the virtual projection image is defined as the second medical image, the processing of the step ST101 is processing of generating the second medical image in which the amount of information is reduced from the first medical image.

When the first medical image is an X-ray CT image, the second medical image generated by the processing of the step ST101 is, for example, a virtual projection image similar to the general chest X-ray image as illustrated in the upper middle of FIG. 4. The processing of the step ST101 is executed by the training-virtual-projection-image generation function 212.

In the step ST102, the generated virtual projection image is displayed on the display 50 included in the diagnosis support apparatus 100, for example.

In the next step ST103, an expert or specialist (for example, a doctor and a radiologist) labels the disease information on the displayed virtual projection image so as to generate training data.

In this specification, the verb of "to label" is used for "to associate correct information/data (i.e., ground truth) with the data for training" such as a training image. Further, the noun of "label", per se, may refer to the correct information/data (i.e., the ground truth). For example, when an expert observes a medical image, and then determines that there is an abnormal portion in the medical image, this medical image is labeled as "including abnormality". Conversely, when the expert observes the medical image, and then determines that there is no abnormal portion anywhere, this medical image is labeled as "including no abnormality". When it is determined that the abnormality is present, a diagnosed "disease name" corresponding to the abnormality may become a label, and a diagnosed "disease site" that is the position of the disease may also become a label. The "labeling" is the operation or action of associating such a label with the medical image.

The "labeling" is the action of associating presence/absence of abnormality and/or a disease name with a medical image, for example via the input interface 40 of the diagnosis support apparatus 100, which is conducted by an expert, for example. When labeling "a disease site", the "labeling" is, for example, the action of setting a square frame and/or an arrow indicating the diagnosed location of the disease site on the medical image.

A labeled virtual projection image is illustrated on the upper right side of FIG. 4. In this labeling, the size of the heart observed in the virtual projection image is larger than the normal size, and thus, the label "cardiomegalia" (i.e., cardiac hypertrophy) is attached as the diagnosed disease name. In addition, a label (white broken line) indicating the position of the enlarged heart is attached in the virtual projection image. The processing of the steps ST102 and ST103 is executed by the disease-information labeling function 213.

One sample of training data is generated from the virtual projection image generated in this manner and the label associated with this virtual projection image. A trained model can be generated by preparing a large amount of such training data, and inputting them to a machine learning model.

The processing from the step ST102 to the step ST103 is similar to the conventional trained-model generation method with the use of a simple X-ray image. Since both of the simple X-ray image and the above-described virtual projection image expresses the entire range of the imaging target by one 2D image, they are suitable for detecting abnormality in the entire imaging range. However, the amount of information included in the simple X-ray image or the virtual projection image is insufficient as compared with an X-ray CT image. Hence, the method of generating the trained model by using only the training data generated in the step ST103 may not necessarily provide sufficient accuracy of disease estimation.

Thus, the diagnosis support apparatus 100 of the present embodiment extracts auxiliary information from a 3D volume image so as to generate a trained model by using both of this auxiliary information and the training data generated in the step ST103.

In the next step ST104, training auxiliary-information (i.e., auxiliary-information for training) is extracted from a training 3D volume image. Various types of auxiliary information can be considered as the auxiliary information to be extracted from the 3D volume image.

In the case shown in FIG. 4, anatomical feature points (i.e., anatomical landmarks) are extracted as auxiliary information from the 3D volume image. Various known techniques including a pattern matching technique can be applied to the processing of extracting the anatomical feature points from the 3D volume image. The lower middle of FIG. 4 illustrates a 3D volume image in which the extracted anatomical feature points are disposed and denoted as black squares. The black squares include identification information of the anatomical feature points (for example, identification information of the aortic valve or apex) and positional information of the anatomical feature points. The processing of the step ST104 is executed by the training-auxiliary-information extraction function 214.

In the next step ST105, the 3D volume image, to which the anatomical feature points are added, is projected under the same projection conditions as the virtual projection image, and thereby a 2D training auxiliary-information image is generated. The lower right of FIG. 4 illustrates a 2D training auxiliary-information image when the auxiliary information is anatomical feature points. The processing of the step ST105 is executed by the training-auxiliary-information-image generation function 215.

In the next step ST106, one training dataset is generated by combining the training data generated in the step ST103 and the training auxiliary-information image generated in the step ST105.

In the next step ST107, it is determined whether the number of training datasets is sufficient or not, i.e., whether the number of training datasets has reached a predetermined number or not. If the number of the training datasets is determined to be sufficient, the processing returns to the step ST100, and the processing from the steps ST100 to ST106 is repeated such that the number of the training datasets is increased to the predetermined number.

If the number of the training datasets is determined to be sufficient, the processing proceeds to the step ST108.

In the step ST108, the prepared training datasets are inputted to the training model (i.e., the model to be trained) such that a trained model is generated by machine learning.

In the next step ST109, the generated trained model is stored in the memory 30, for example. The processing from the steps ST106 to ST109 is executed by the model generation function 216.

The foregoing is the processing in the training phase. Next, the processing of the inference phase will be described by referring to FIG. 5 and FIG. 6.

Figure 5:
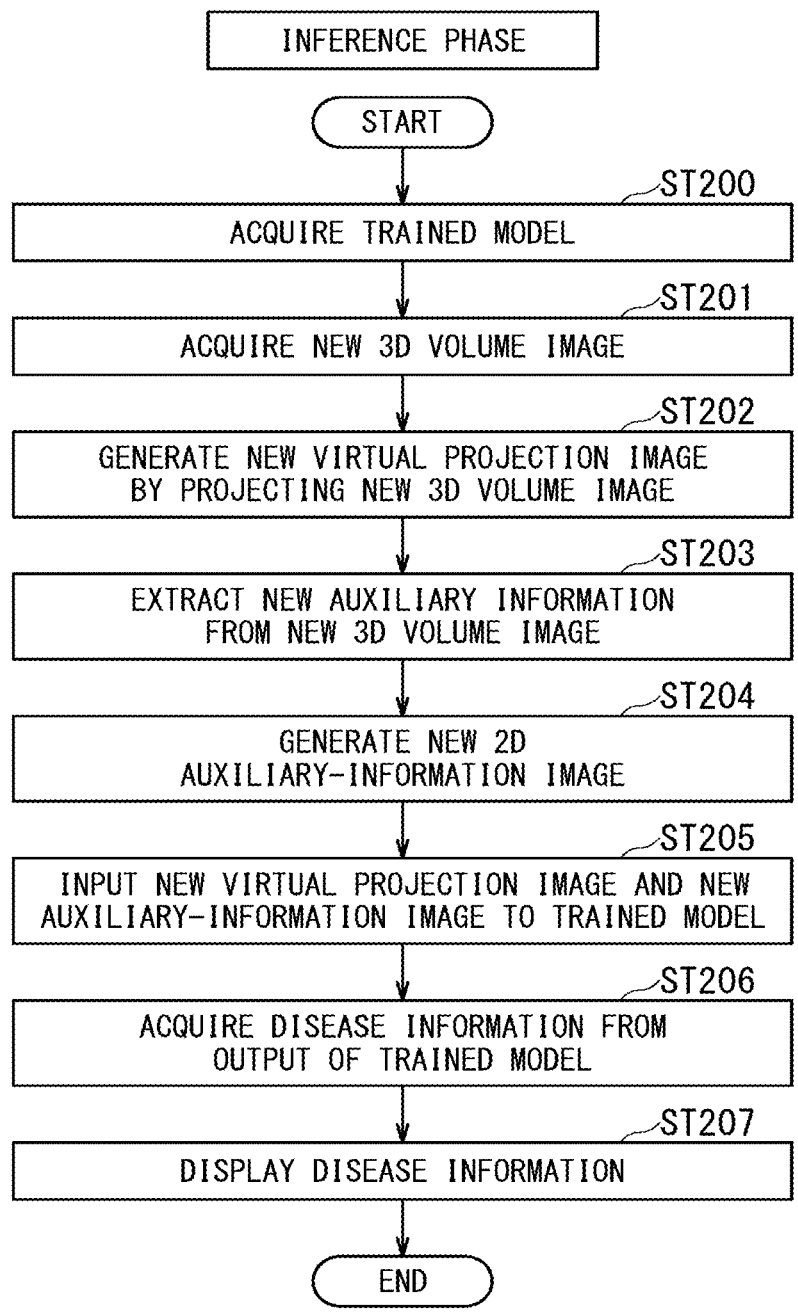
FIG. 5 is a flowchart illustrating an operation of an inference phase of the first embodiment.

In the step ST200 of FIG. 5, for example, the trained model 226 stored in the memory 30 is read out.

In the next step ST201, a first medical image to be diagnosed, i.e., a new 3D volume image is acquired. The acquisition source is, for example, the modality 510 (such as the X-ray CT apparatus 511) connected to the network 500 and/or the image server 520 connected to the network 500, similarly to the training phase. The new 3D volume image read out in the step ST201 is, for example, composed of a large number of tomographic images as illustrated in the upper left of FIG. 6, similarly to the training phase. The processing of the step ST201 is executed by the new-image acquisition function 221 of the diagnosis support apparatus 100.

In the step ST202, the acquired new 3D volume image is projected to generate a second medical image (i.e., a new virtual projection image). The processing of the step ST202 corresponds to the step ST101 in the training phase, and thus, the contents of the processing and the projection direction in the step ST202 are the same as the step ST101 of the training phase. The new virtual projection image generated in the step ST202 is a 2D virtual projection image similar to a general chest X-ray image, as illustrated in the upper middle of FIG. 6. The processing of the step ST202 is executed by the new-virtual-projection-image generation function 222.

In the next step ST203, new auxiliary information is extracted from the new 3D volume image. The processing of the step ST203 corresponds to the step ST104 in the training phase. In the case shown in FIG. 6, anatomical feature points are extracted as the auxiliary information from the new 3D volume image, similarly to the step ST104. The processing of the step ST203 is executed by the new auxiliary-information extraction function 224.

Figure 6:
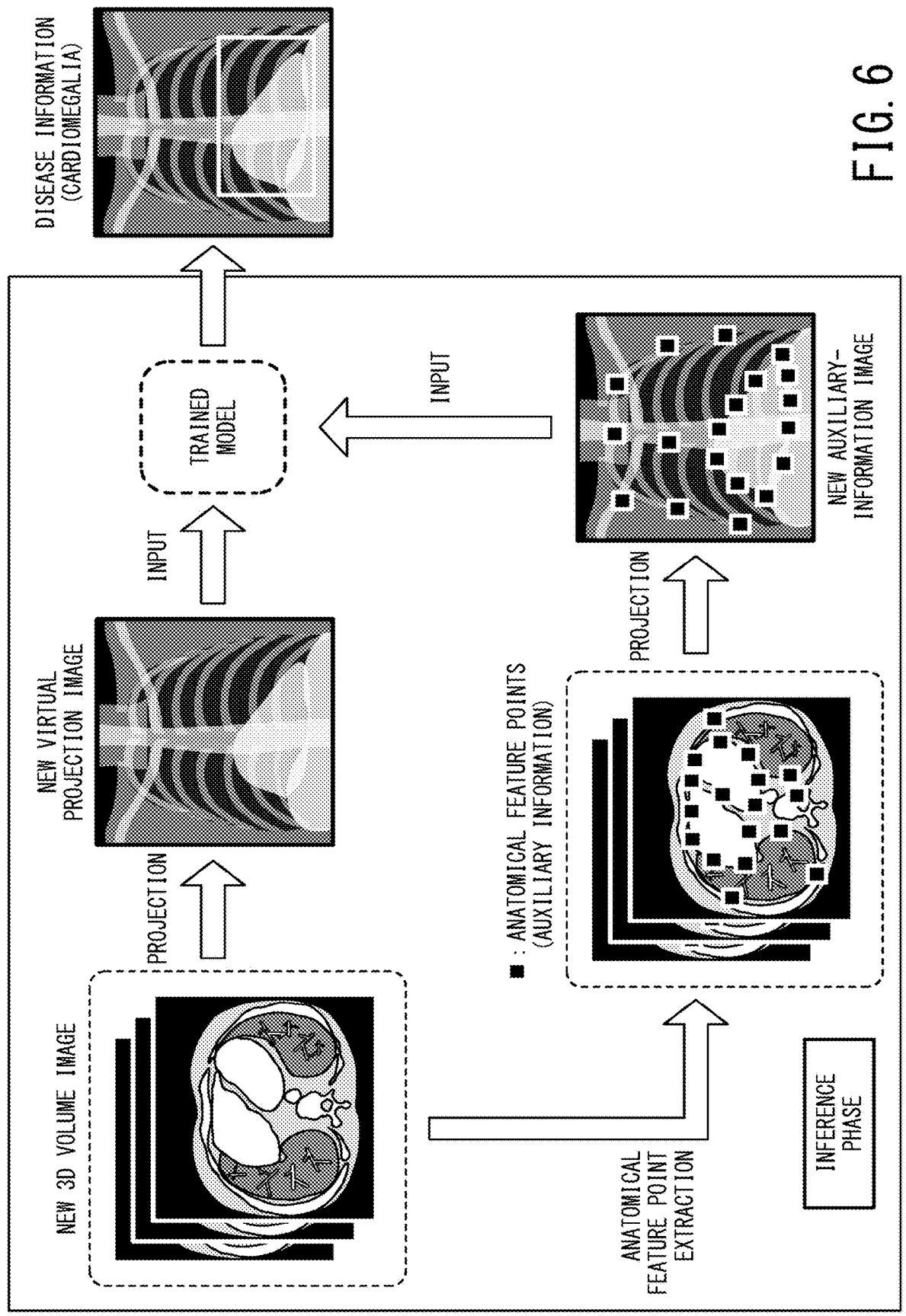
FIG. 6 is a schematic diagram illustrating an operation concept of the inference phase.

In the next step ST204, a new 2D auxiliary-information image is generated by projecting the extracted 3D auxiliary information. The processing of the step ST204 corresponds to the step ST105 in the training phase. The new 2D auxiliary-information image is generated by projecting the 3D volume image, to which anatomical feature points are added, under the same projection conditions as the virtual projection image, similarly to the step ST105. The lower right of FIG. 6 illustrates a new 2D auxiliary-information image when the auxiliary information is the anatomical feature points. The processing of the step ST204 is executed by the new auxiliary-information image generation function 225.

In the step ST205, the new virtual projection image generated in the step ST202 and the new 2D auxiliary-information image generated in the step ST204 are inputted to the trained model.

In the next step ST206, the disease information outputted from the trained model, i.e., the disease information inferred by the trained model is acquired.

In the next step ST207, the acquired disease information may be superimposed, for example, on the new 2D virtual projection image generated in the step ST202 so that new 2D virtual projection image is displayed on the display 50 together with the disease information. For example, when the disease information inferred by the trained model is the disease name "cardiomegalia" and the diseased site is the entirety of the enlarged heart, the disease name "cardiomegalia" may be displayed next to the 2D virtual projection image, and a square frame indicating the diseased site may be superimposed on the 2D virtual projection image.

Conventionally, a technique for machine learning with the use of a 2D image such as a simple X-ray image is known. However, only a rough diagnostic result can be expected from the result of machine learning with the use of a 2D image. Accordingly, if a suspicion of a disease is found in a simple X-ray image, it often proceeds to a further examination using a 3D volume image such as an X-ray CT image.

Meanwhile, machine learning with the use of a 3D volume image such as an X-ray CT image is expected to enable highly accurate disease estimation. However, in the case of executing supervised learning, it is necessary to manually label the ground truth. Since X-ray CT images are three-dimensional, labeling takes more time than the case of simple X-ray images, which makes it difficult to collect a large number of ground-truth labeled images. In the first place, it is not easy to find an abnormal site from a huge number of tomographic images without any prior information. Even when the abnormal site is found, it is difficult to three-dimensionally specify the position of the abnormal site and set a region surrounding the three-dimensional abnormal site.

In addition, since a 3D volume image has a larger amount of data than a 2D image, the processing load on the computer that performs machine learning also increases in the case of treating 3D volume images.

In view of the above-described problem, the diagnosis support apparatus 100 of the first embodiment projects a 3D volume image such as an X-ray CT image so as to generate a 2D virtual image, while extracting auxiliary information from the 3D volume image. Thus, in the training phase, the diagnosis support apparatus 100 generates a trained model by using the 2D virtual image and the auxiliary information image. On the other hand, in the inference phase, the diagnosis support apparatus 100 infers disease information by inputting the 2D virtual image and the auxiliary information image to the trained model.

With such a configuration, in the training phase, labeling is performed on the 2D virtual image, in which information amount is reduced from the 3D volume image, and thus, the operation of labeling is facilitated. As a result, many trained models can be generated. As to generation of the trained model and the inference using the trained model, the auxiliary information extracted from the 3D volume image is also used in addition to the 2D virtual image. Hence, the generated trained model reflects depth information and 3D shape information, which are included in the 3D volume image, resulting in that the accuracy of inferring the disease information can be improved.

For example, in the above-described case, the 3D shape information of the enlarged heart is obtained as the distribution of the anatomical feature points inside the heart or at the outer periphery of the heart. Thus, a trained model in which the 3D shape information of the heart is reflected is generated, and an inference of disease (for example, cardiomegalia), in which the 3D shape information of the heart is reflected, can be conducted with high accuracy.

Modification of First Embodiment

In the above-described first embodiment, detection processing of anatomical feature points is performed on the 3D volume image that is the first medical image, and information on the anatomical feature points is extracted as the auxiliary information from the 3D volume image. However, the auxiliary information to be extracted from the 3D volume image is not limited to the anatomical feature points, and there are various modifications of the first embodiment.

Figure 7:
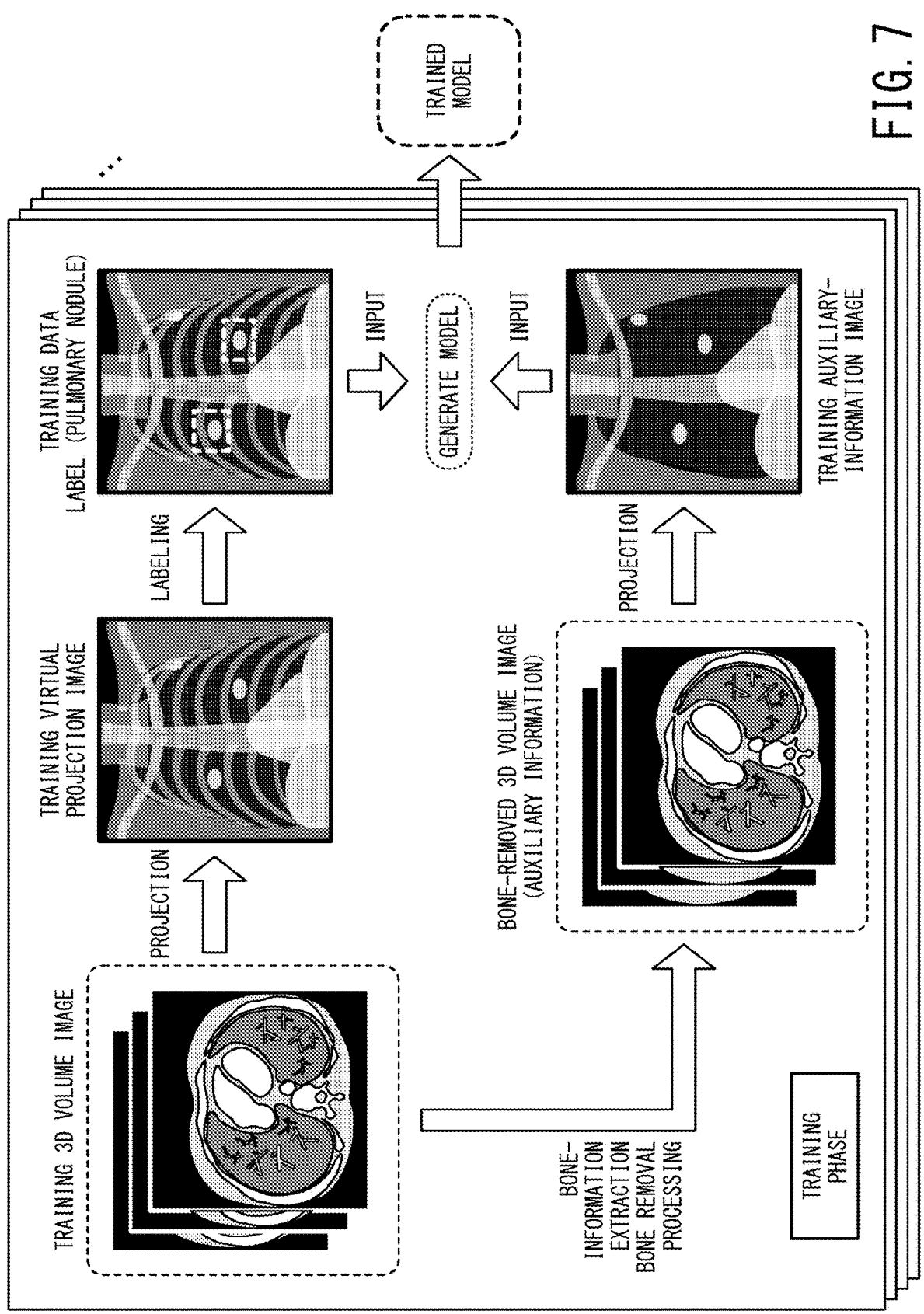
FIG. 7 is a schematic diagram illustrating an operation concept of the training phase in a modification of the first embodiment.
Figure 8:
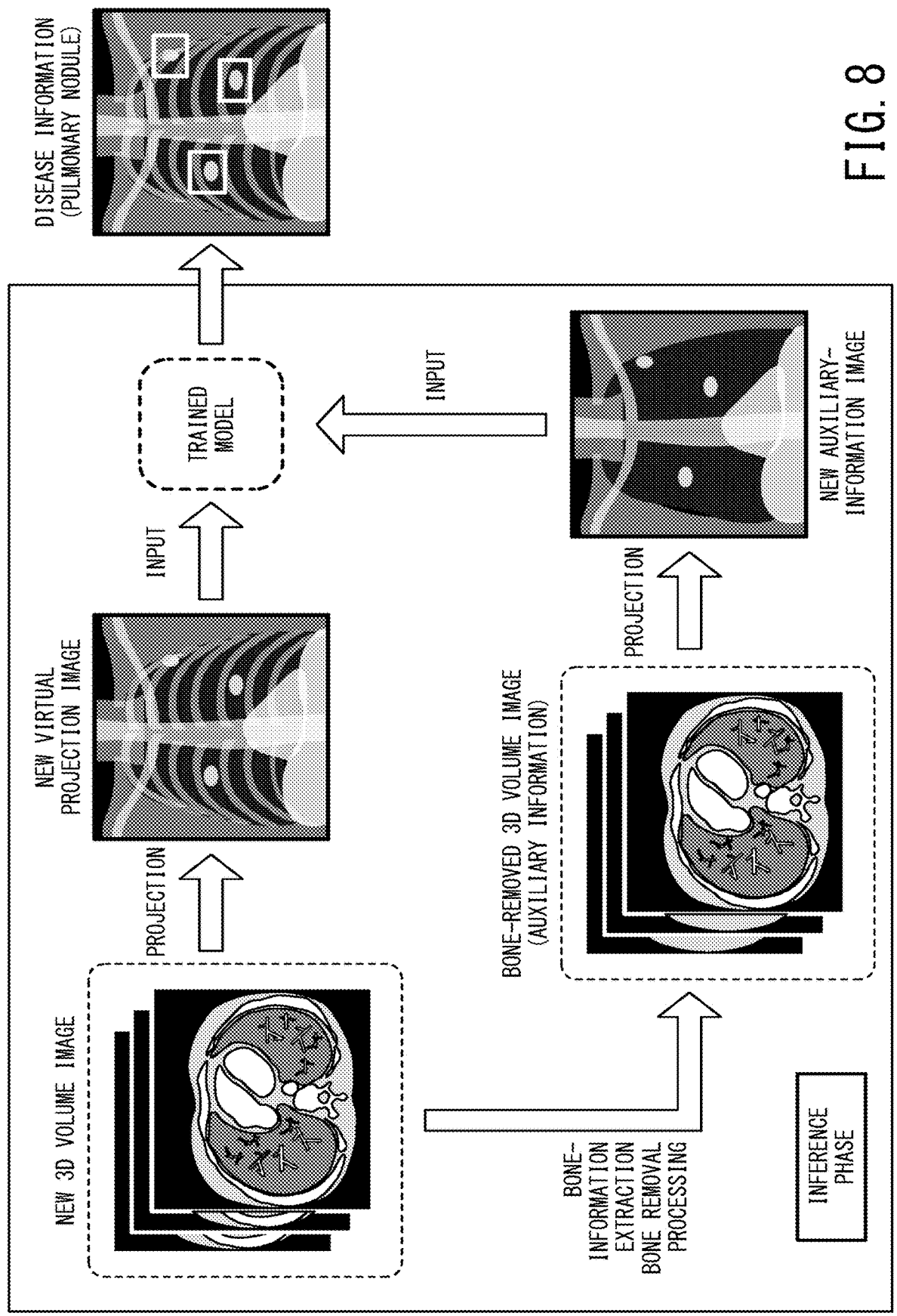
FIG. 8 is a schematic diagram illustrating an operation concept of the inference phase in the modification of the first embodiment.

For example, in the first modification, as shown in FIG. 7 and FIG. 8, a known bone removal processing is performed on the 3D volume image, which is the first medical image, and the image in which the bone is removed (hereinafter, shortly referred to as a bone-removed image) can be extracted as the auxiliary information from the 3D volume image.

FIG. 7 is a schematic diagram illustrating an operation concept of the training phase of the diagnosis support apparatus 100 in the first modification. Note that the process of generating a 2D training virtual projection image from the training 3D volume image and the process of labeling this 2D training virtual projection image to generate training data are the same as the above-described first embodiment.

However, in the case shown in FIG. 7, three lung nodules in the lung field are listed as the diseases. Note that, in the case shown in FIG. 7, among the three lung nodules, the lung nodule in the upper part of the left lung is hidden by the bone in the training virtual projection image, making it difficult to visually recognize. As a result, one of the three lung nodules is not labeled as to its location. Such training data are one input to a model to be trained.

On the other hand, the training auxiliary-information image, which is the other input to the model to be trained, is an image having been subjected to the bone removal processing. Thus, the training auxiliary-information image clearly depicts the lung nodule in the upper part of the left lung, which has been hidden by the bone before the bone removal processing.

As a result, the information of the disease hidden by the bone is also reflected in the model generation process in the training phase, and a trained model with high accuracy can be generated.

FIG. 8 is a schematic diagram illustrating an operation concept of the inference phase of the diagnosis support apparatus 100 in the first modification. In the inference phase, the 2D virtual projection image is generated from the new 3D volume image and is used as one input to the trained model.

Additionally, bone removal processing is performed on the new 3D volume image to generate a bone-removed 3D volume image. This bone-removed 3D volume image is projected to generate a bone-removed 2D auxiliary-information image, and this 2D auxiliary-information image is used as the other input to the trained model.

As described above, in the first modification of the first embodiment, the virtual projection image, in which the bones are depicted, and the bone-removed auxiliary-information image is inputted to the trained model. As a result, for example, even when there is a lung nodule hidden by the bone in the virtual projection image, the disease inference can be accurately conducted without overlooking this hidden lung nodule.

In addition to the above-described image in which the anatomical feature points are depicted or the bones are removed, it is also conceivable, as another modification, to perform processing of extracting organs such as the lung, the heart, and the liver on a 3D volume image to generate an organ-extracted image and use this organ-extracted image as an auxiliary information image.

Further, as the auxiliary information, data indicating the auxiliary information itself can be used instead of the image. In this case, in the training phase, the model is generated by using the virtual projection image and the data indicating the auxiliary information. Also in this case, in the inference phase, the virtual projection image and the data indicating the auxiliary information are inputted to the trained model.

So far, a 2D virtual projection image generated by projecting a 3D volume image has been described as one of the types of the second medical image, which is generated from the 3D volume image as the first medical image, and is reduced in amount of information as compared to the first medical image. In this case, the labeling work is performed not on the 3D volume image but on the 2D virtual projection image, and thus, the labeling work is facilitated, and the number of training data can be increased.

As the second medical image, in which the amount of information is reduced, it is conceivable to use an image other than the 2D projection image. For example, resolution-reduction processing such as decimation processing may be performed on the 3D volume image, and a 3D image with a lower resolution than the original 3D volume image (i.e., first medical image) may be used as the second medical image. For example, the 2D medical image may be generated by performing resolution-reduction processing on the 3D volume image for at least one of the X-axis, the Y-axis, and the Z-axis. Also in this case, the amount of information in the second medical image, which is to be labeled, is reduced to be smaller than that in the original 3D volume image, and thus the labeling work is facilitated.

Second Embodiment

The second embodiment is an embodiment in which the training in the above-described first embodiment is configured as so-called transfer training.

Figure 9:
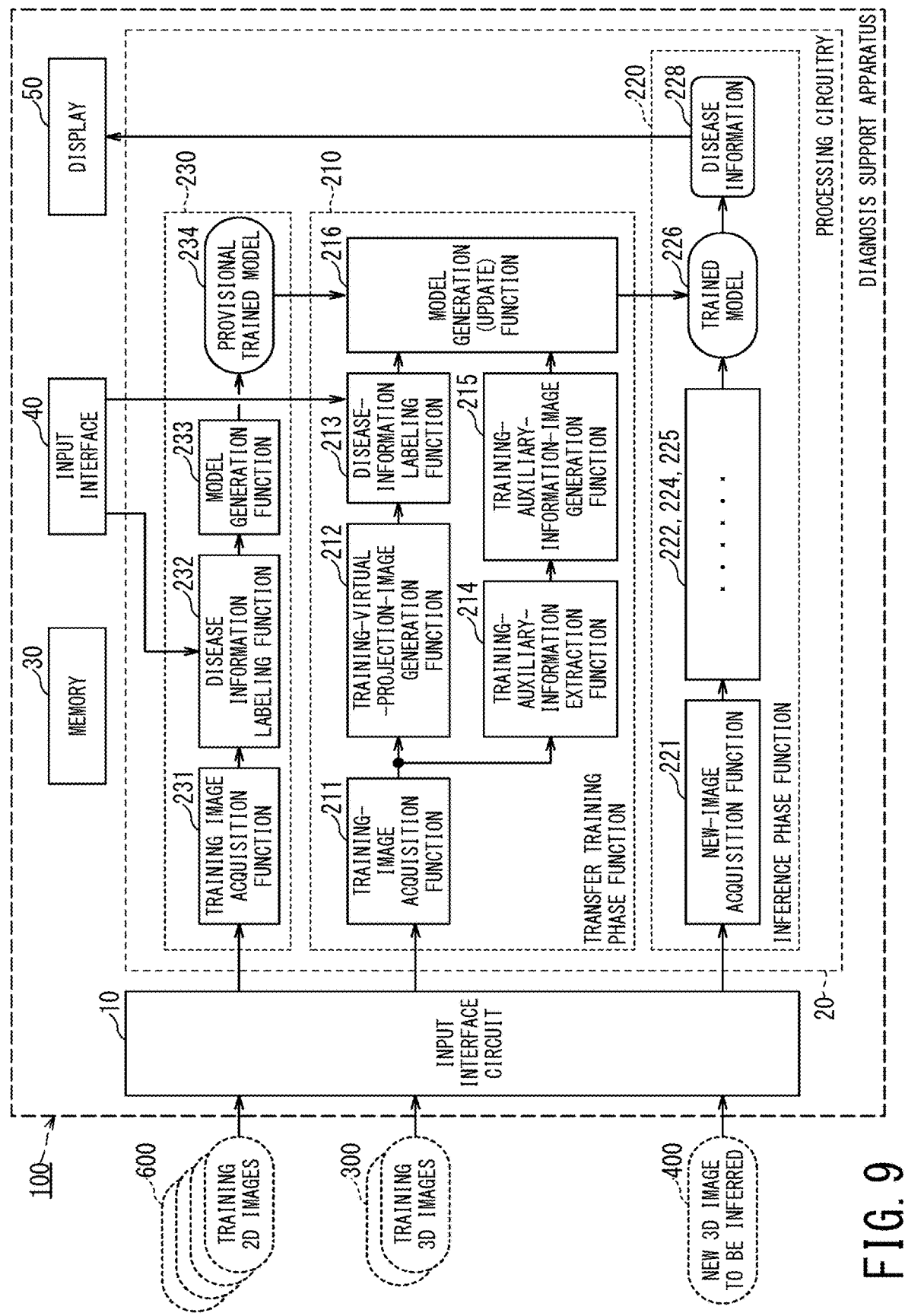
FIG. 9 is a block diagram illustrating the configuration of the diagnosis support apparatus according to the second embodiment.
Figure 10:
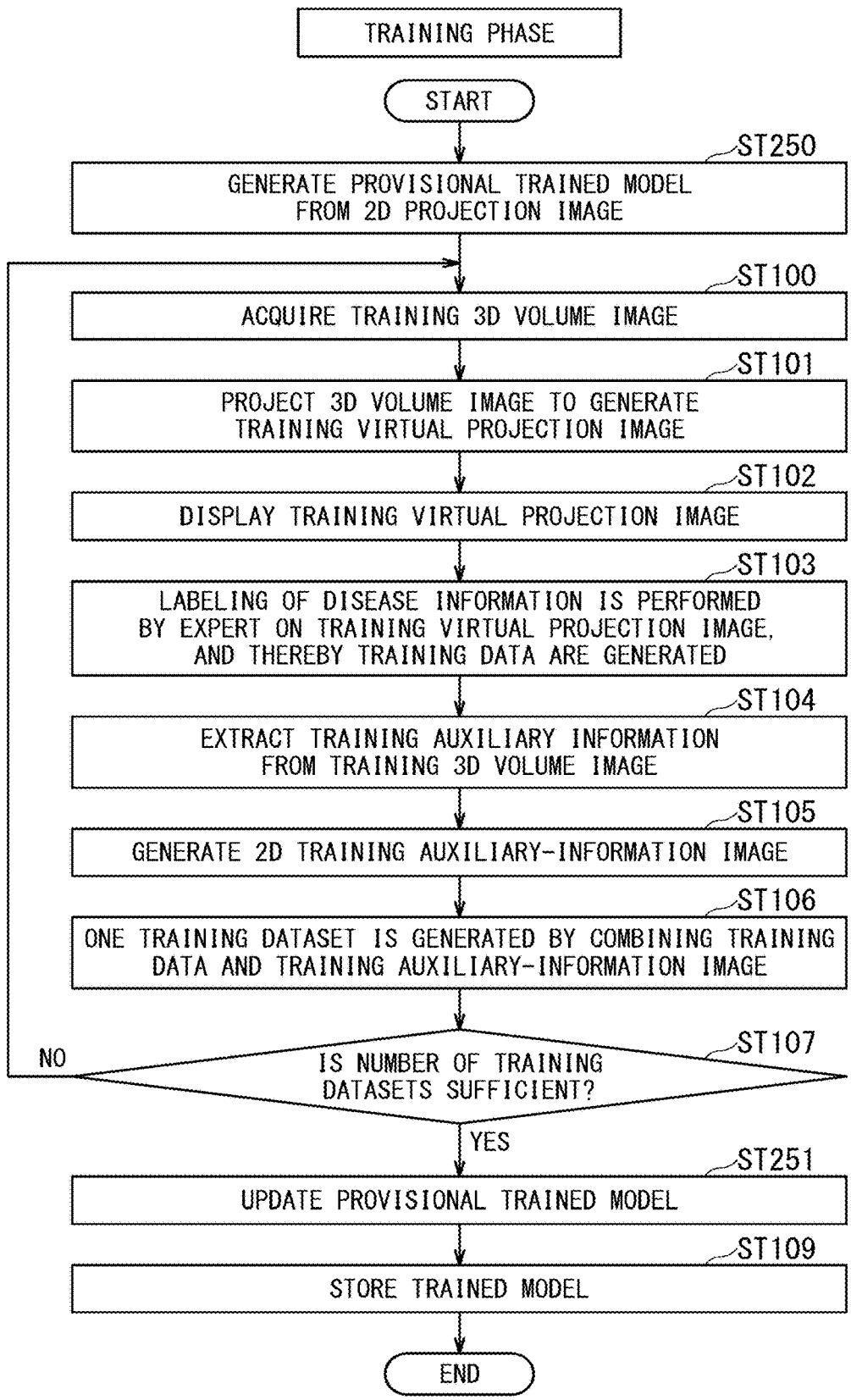
FIG. 10 is a flowchart illustrating an operation of the training phase according to the second embodiment.
Figure 11:
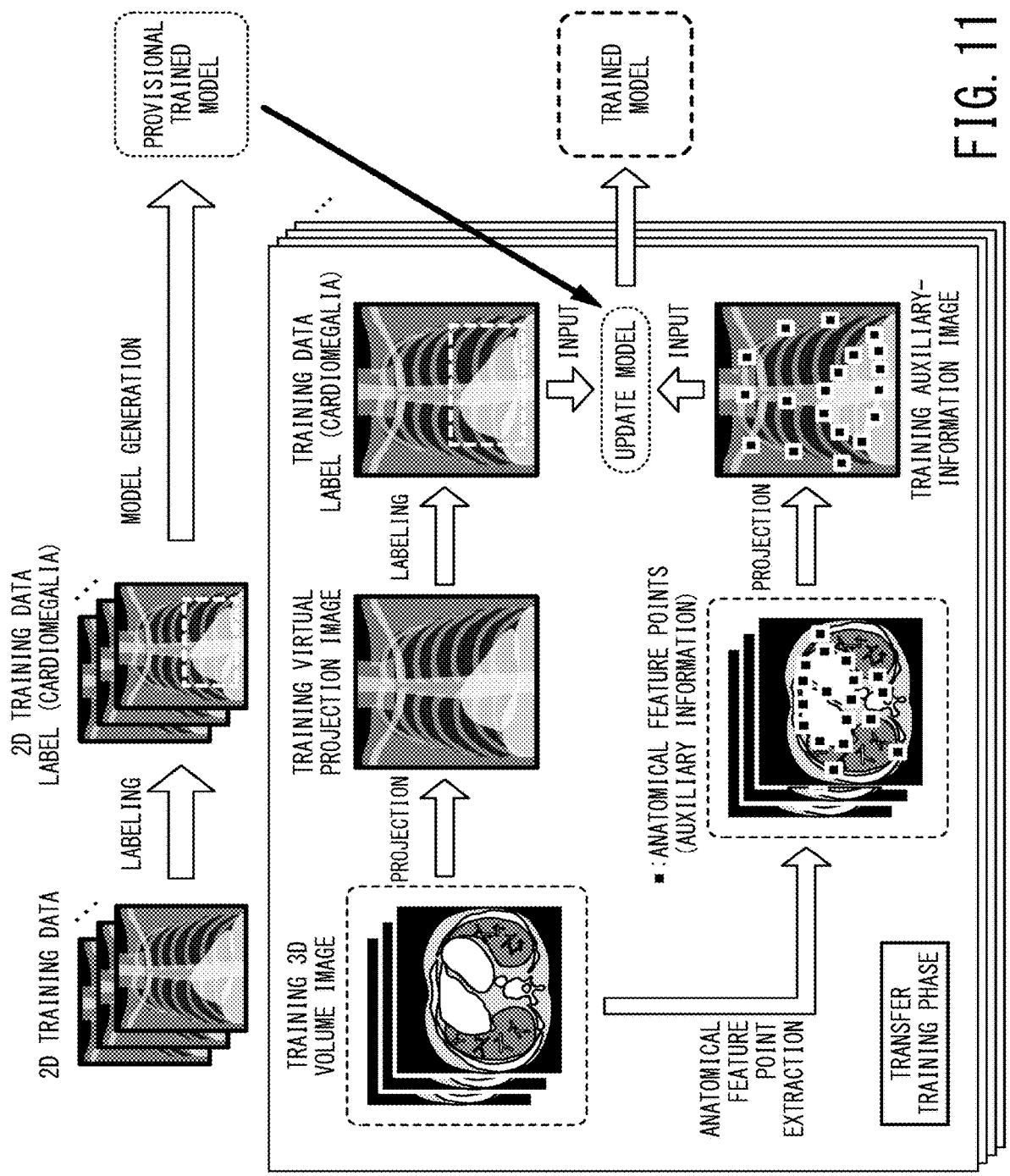
FIG. 11 is a schematic diagram illustrating an operation concept of the training phase according to the second embodiment.

FIG. 9 is a block diagram illustrating the configuration of the diagnosis support apparatus 100 according to the second embodiment. FIG. 10 is a flowchart illustrating an operation of the training phase of the diagnosis support apparatus 100 according to the second embodiment. FIG. 11 is a schematic diagram illustrating an operation concept of the diagnosis support apparatus 100 according to the second embodiment. Hereinafter, the second embodiment will be described focusing on the difference between the first and second embodiments.

As shown in FIG. 9, the configuration of the second embodiment further includes an initial training phase function 230 as compared with the first embodiment. The initial training phase function 230 includes, as its internal configuration, a training image acquisition function 231, a disease information labeling function 232, and a model generation function 233.

The operation of the second embodiment differs from the operation flow of the first embodiment (FIG. 3) in that the processing of the step ST250 is added as shown in FIG. 10. In the step ST250, as shown in the upper part of FIG. 11, a provisional trained model is generated by using 2D training data.

The 2D training data are, for example, general X-ray images. In the case of general X-ray images, a large number of images corresponding to various disease cases can be obtained relatively easily from existing databases. For this reason, in the step ST250, the 2D training data such as general X-ray images are acquired, and the provisional trained model is generated from the data obtained by labeling a large number of the acquired 2D training data.

Although the provisional trained model is excellent in terms of number of samples used for generation, 3D information is not reflected in the provisional trained model, since the generation sources of the provisional trained model are only general 2D X-ray images. Thus, in the second embodiment, the training datasets in which the 3D information is reflected are generated by the processing of the steps ST100 to ST107 in FIG. 10. The processing of the steps ST100 to ST107 in FIG. 10 is the same as the first embodiment shown in FIG. 3.

Subsequently, in the step ST251, the final trained model is generated by updating the provisional trained model generated from only the 2D information, by using the training datasets in which the 3D information is reflected. Since the operation in the inference phase in the second embodiment is the same as that of the first embodiment, duplicate description is omitted.

Training based on 3D volume images such as an X-ray CT image has a disadvantage that it cannot always secure sufficient number of training samples. However, in the second embodiment, this disadvantage can be complemented by training with the use of general X-ray images that can secure abundant number of training samples. Further, the configuration of the second embodiment can generate a highly accurate trained model in which 3D information such as 3D shape and depth information are reflected.

Third Embodiment

Figure 12:
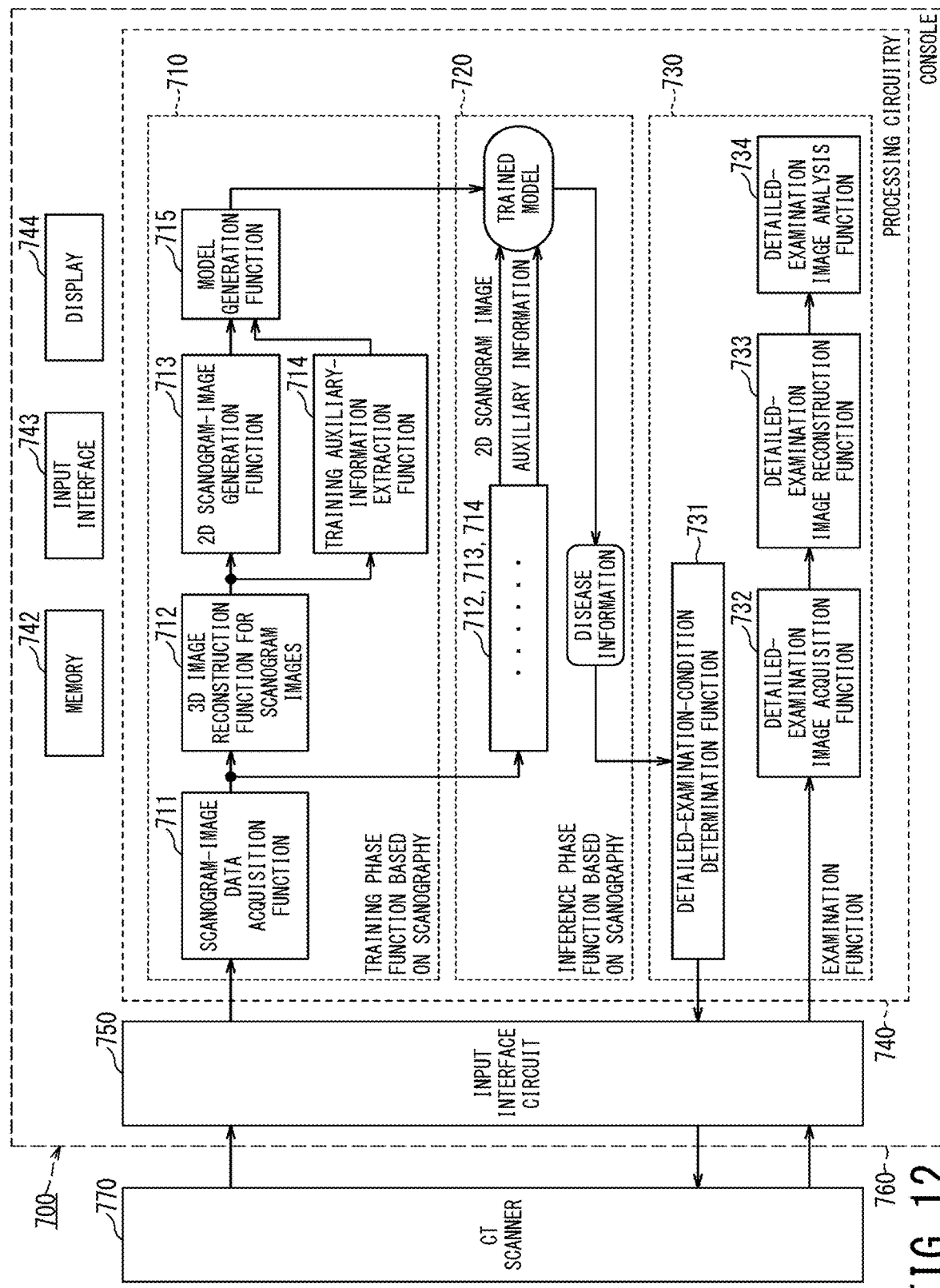
FIG. 12 is a block diagram illustrating a configuration of the X-ray CT apparatus according to the third embodiment.

FIG. 12 is a block diagram illustrating a configuration of an X-ray CT apparatus 700 according to the third embodiment. The X-ray CT apparatus 700 includes a CT scanner 770 and a console 760. The CT scanner 770 rotates an X-ray tube and an X-ray detector at high speed around the object so as to acquire projection data corresponding to many slices, and then sends the projection data to the console 760.

The console 760 includes processing circuitry 740, a memory 742, an input interface 743, a display 744, and an input interface circuit 750. Hardware configurations and functions of these components are respectively the same as the processing circuitry 20, the memory 30, the input interface 40, the display 50, and the input interface circuit 10 in the diagnosis support apparatus 100, and duplicate description is omitted.

The processing circuitry 740 implements at least a training phase function 710 based on scanography (i.e., imaging for acquiring scanogram images), an inference phase function 720 based on scanography, and an examination function 730.

The training phase function 710 based on scanography includes, as its internal functions, a scanogram-image data acquisition function 711, a 3D image reconstruction function 712 for scanogram images, a 2D scanogram-image generation function 713, a training auxiliary-information extraction function 714, and a model generation function 715.

The inference phase function 720 based on scanography includes, as its internal functions, the 3D image reconstruction function 712 for scanogram images, the 2D scanogram-image generation function 713, and the training auxiliary-information extraction function 714.

The examination function 730 includes a detailed-examination-condition determination function 731, a detailed-examination image acquisition function 732, a detailed-examination image reconstruction function 733, and a detailed-examination image analysis function 734.

Originally, scanography is an imaging for generating a scanogram image that is an image to be used for positioning and is often performed under low-dose and low-resolution imaging conditions as compared with normal imaging or imaging for a detailed examination.

The X-ray CT apparatus 700 according to the third embodiment uses the data acquired by scanography to generate a trained model for machine learning. The data acquired by scanography is inputted to this trained model, and disease information is outputted as CAD (Computer-Aided Diagnosis).

In the X-ray CT apparatus 700 of the third embodiment, in the training phase, the 3D volume image is reconstructed from the data acquired by scanography, and then a 2D scanogram image is generated from this 3D volume image. This 2D scanogram image corresponds to the 2D virtual projection image in the first embodiment. The training data are generated by labeling the ground truth on this scanogram image.

In the X-ray CT apparatus 700 of the third embodiment, the training auxiliary-information image is generated by performing processing of extracting anatomical feature points and/or processing of extracting auxiliary information such as bone removal processing on a 3D volume image that is reconstructed from the data acquired by scanography. Then, machine learning is performed, by using the training data and the training auxiliary-information image, which are generated from the data of scanogram images, to generate the trained model.

The generation of the trained model described above is performed before the examination of the object, and the generated trained model is stored in the memory 742.

During the examination of the object, the inference phase function 720 based on scanography and the examination function 730 of the configuration shown in FIG. 12 operate.

Figure 13:
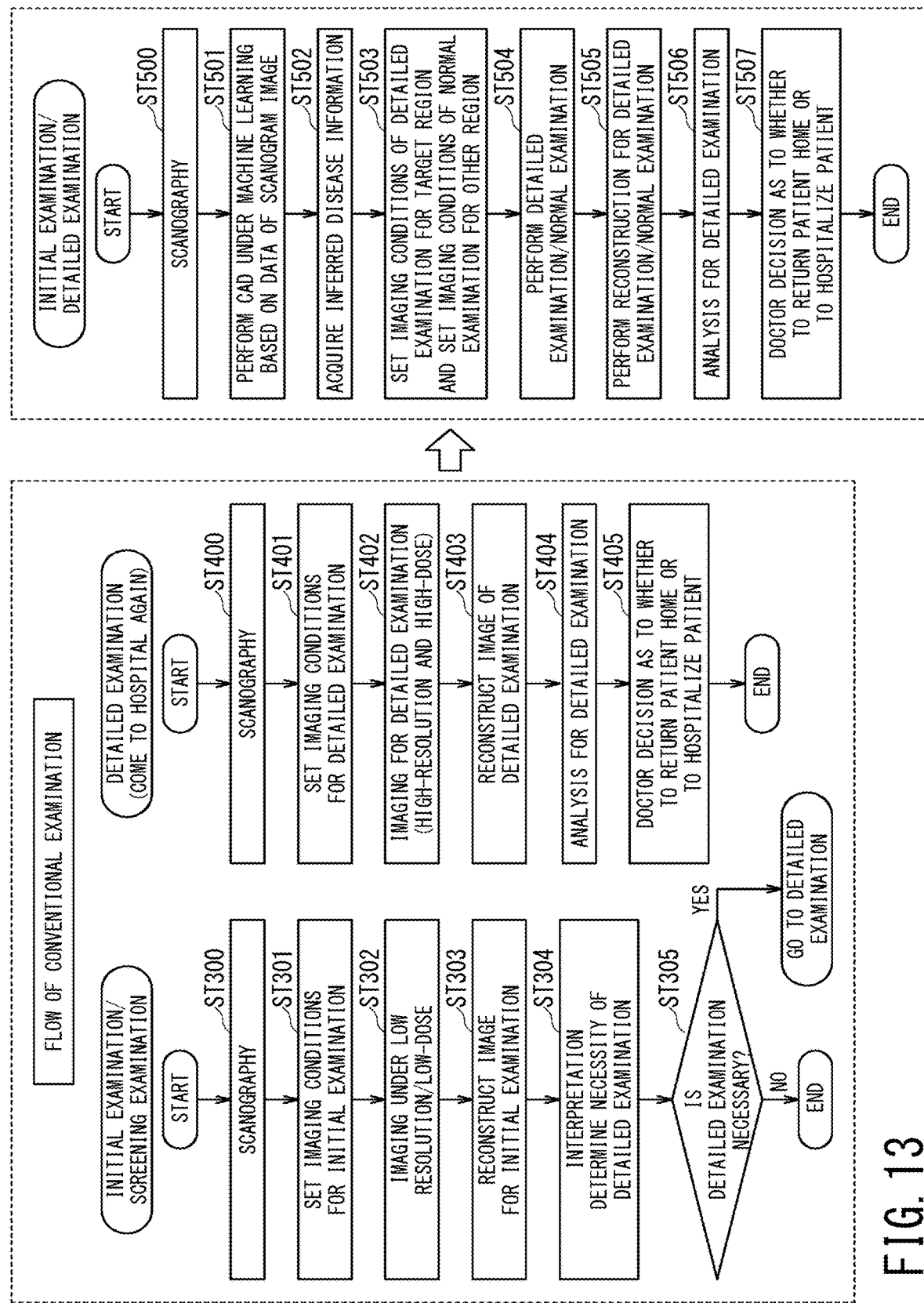
FIG. 13 is a flowchart illustrating an operation of the X-ray CT apparatus according to the third embodiment.

FIG. 13 is a flowchart illustrating a typical conventional examination flow and an examination flow by the X-ray CT apparatus 700 according to the third embodiment.

In the conventional examination, an initial examination or a screening examination is performed. If it is determined that a detailed examination is necessary as the result of the initial examination or the screening examination, normally, the patient comes to the hospital again at a later date for the detailed examination.

For example, in the initial examination or screening examination, as shown in the flowchart on the left side of FIG. 13, scanography is performed in the step ST300.

In the next step ST301, imaging conditions for the initial examination or screening examination are set.

In the next step ST302, imaging for the initial examination or the screening examination is performed under the imaging conditions of low resolution and low dose as compared with the detailed examination.

In the next step ST303, images of the patient are reconstructed from the acquired data.

In the next step ST304, a doctor interprets the generated images and determines whether a detailed examination is necessary or not.

In the next step ST305, if it is determined in the step ST304 that the detailed examination is not necessary, the examination is completed. If it is determined in the step ST304 that the detailed examination is necessary, the processing proceeds to the detailed examination as shown in the flowchart in the middle of FIG. 13.

In the detailed examination, imaging is performed again in the step ST400 to generate a scanogram image for positioning.

In the next step ST401, imaging conditions for the detailed examination are set.

In the next step ST402, imaging for the detailed examination is performed under the imaging conditions of high-resolution and high-dose.

In the next step ST403, images of the detailed examination are reconstructed.

In the next step ST404, the images of the detailed examination are analyzed.

In the next step ST405, the doctor makes the final determination as to whether to return the patient home or to hospitalize the patient. In this manner, the conventional examination requires a considerable amount of time to make a final decision.

Contrastively, in the X-ray CT apparatus 700 of the third embodiment, the examination process is simplified as shown in the flowchart on the right side of FIG. 13.

Specifically, in the step ST500, scanography is performed.

In the next step 501, the data acquired by the scanography are used not only for generating scanogram images but also for performing CAD by machine learning.

As described above, the trained model based on the data of scanography has already been generated before this examination.

In the step ST501, the inference phase function 720 based on scanography of the X-ray CT apparatus 700 generates scanogram images by using the data of scanography acquired in the step ST500. Meanwhile, in the step ST501, auxiliary-information extraction processing, such as processing of extracting anatomical feature points or bone removal processing, is performed on the 3D volume image reconstructed from the data of scanography.

Then, in the next step ST502, inferred disease information is acquired by inputting the scanogram image and the auxiliary information image to the trained model.

In the next step ST503, the examination function 730 of the X-ray CT apparatus 700 sets the imaging conditions such as the imaging range of the detailed examination and the dose, in addition to the reconstruction method for the detailed examination.

Figure 14:
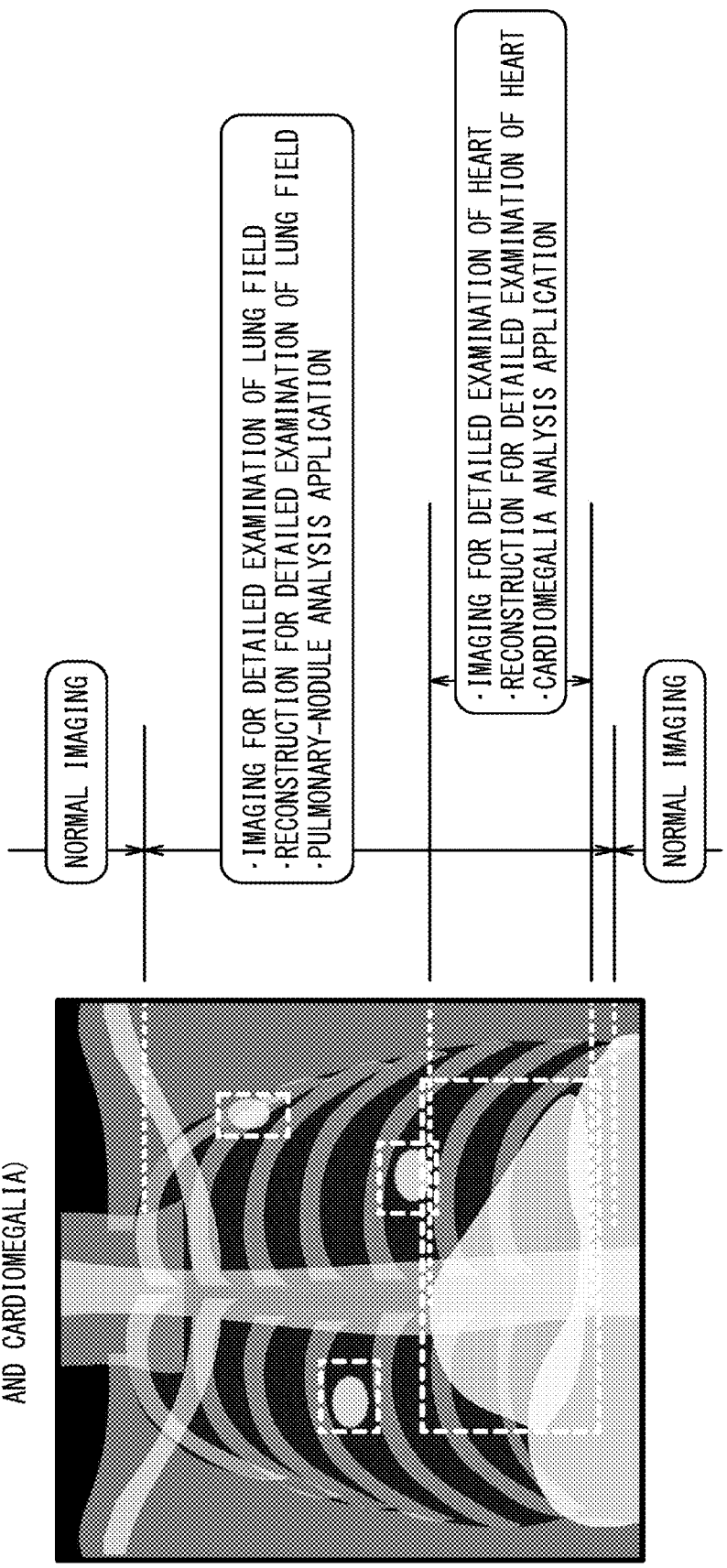
FIG. 14 is a schematic diagram illustrating an operation concept of the X-ray CT apparatus according to the third embodiment.

For example, when the inferred disease is pulmonary nodule or cardiomegalia, as illustrated in FIG. 14, imaging conditions for the detailed examination are set for the lung region and the cardiac region that are important for diagnosing the inferred disease, while the imaging conditions for normal imaging are set for the other regions. The processing of the step ST503 is executed by the detailed-examination-condition determination function 731 in FIG. 12.

After setting the imaging conditions in the above-described manner, in the next step ST504, imaging under one or more imaging conditions having been set for the respective regions in one examination is time-sequentially performed. This time-sequential imaging is performed while the imaging conditions, which have been set for the respective regions, are reflected. The processing of the step ST504 is executed by the detailed-examination image acquisition function 732.

In the next step ST505, reconstruction images are generated by the reconstruction method suitable for the detailed examination of the lungs and the heart, respectively. The processing of the step ST505 is executed by the detailed-examination image reconstruction function 733.

If necessary, detailed analysis may be further performed by using analysis application software prepared for each disease such as lung nodule in the step ST506. The processing of the step ST506 is executed by the detailed-examination image analysis function 734.

In the final step ST507, the doctor makes the final decision as to whether to return the patient home or to hospitalize the patient.

According to the X-ray CT apparatus 700 of the third embodiment, the period from the initial examination to the final decision by the doctor can be shortened, and abnormality can be detected in the early stage, if any.

According to at least one embodiment as described above, abnormality can be efficiently detected from a high-resolution 3D image such as an X-ray CT image by using techniques such as machine learning. In addition, the efficiency of the examination using an X-ray CT apparatus can be improved, and abnormality can be detected in the early stage.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A diagnosis support apparatus comprising:
an input circuit configured to acquire a first medical image obtained by imaging an object; and
processing circuitry configured to
generate a second medical image from the first medical image in such a manner that information included in the second medical image is reduced from information included in the first medical image,
extract auxiliary information from the first medical image,
input the second medical image and the auxiliary information into a trained model generated through machine learning, and cause the trained model to infer a disease information about the object, based on the second medical image and the auxiliary information, and
wherein the processing circuitry is configured to extract a bone-removed image from the first medical image as the auxiliary information by performing bone removal processing on the first medical image.

2. The diagnosis support apparatus according to claim 1, wherein:
the first medical image is a three-dimensional volume image; and
the second medical image is a two-dimensional virtual projection image generated from the three-dimensional volume image.

3. The diagnosis support apparatus according to claim 1, wherein:
the first medical image is a three-dimensional volume image; and
the second medical image has a lower resolution than the three-dimensional volume image.

4. The diagnosis support apparatus according to claim 1, wherein the processing circuitry is configured to extract information on an anatomical feature point from the first medical image as the auxiliary information by performing processing of detecting the anatomical feature point on the first medical image.

5. The diagnosis support apparatus according to claim 1, further comprising a display, wherein:

the first medical image is a three-dimensional volume image; and the processing circuitry is configured to cause the display to display a two-dimensional image on which information on inference result of the disease is superimposed.

* * * * *